UNITED STATES PATENT OFFICE.

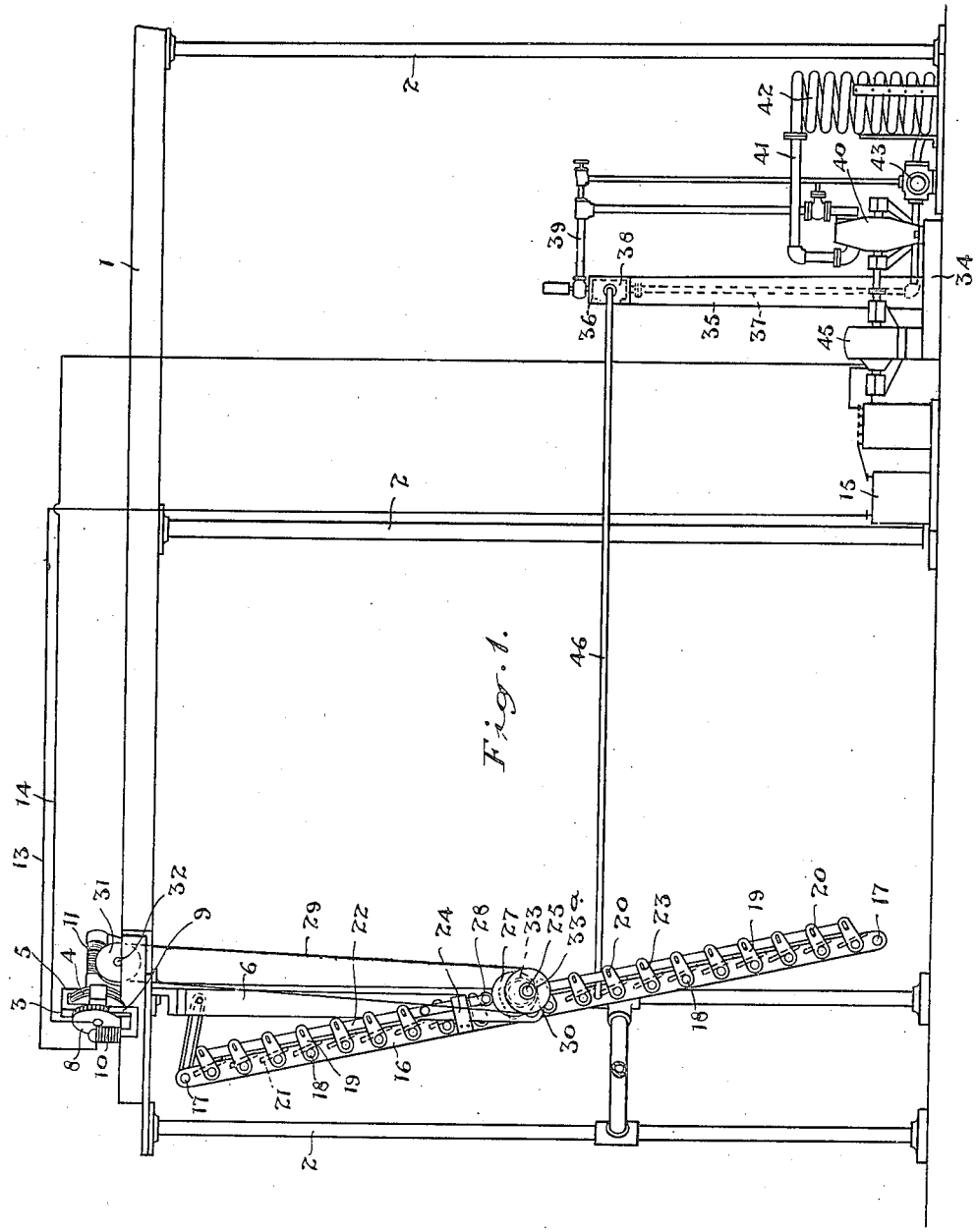

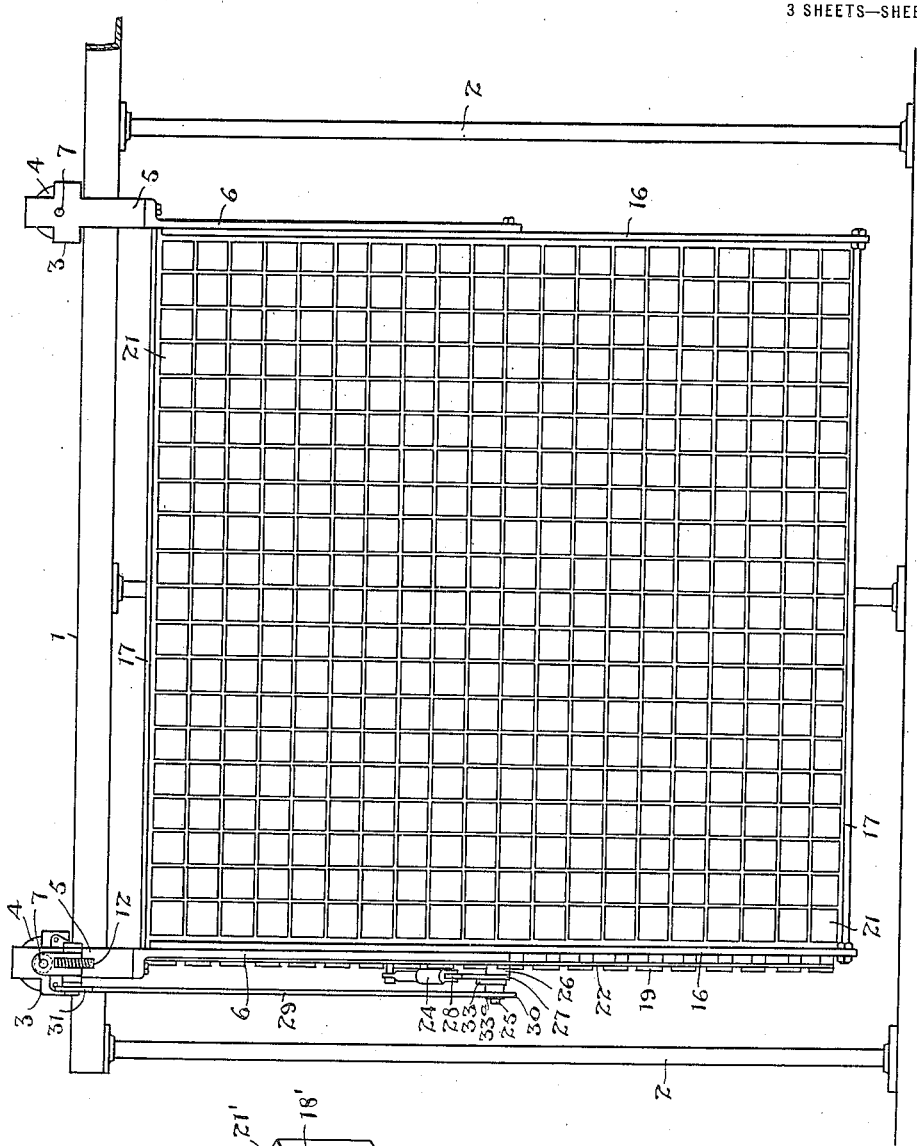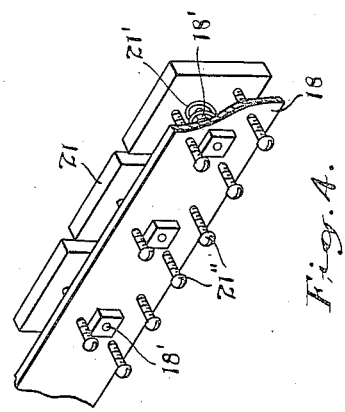

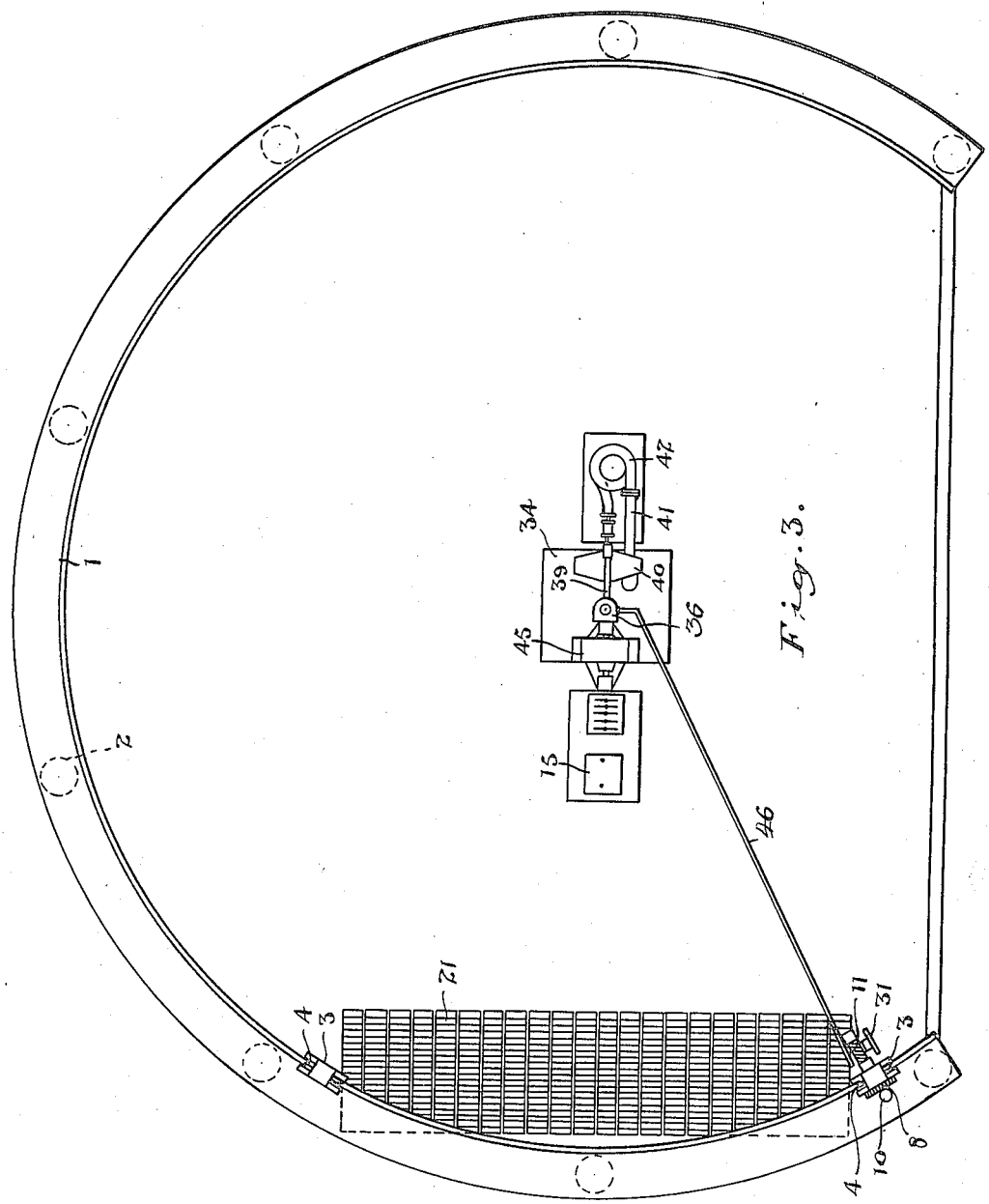

WALTER JAMES HARVEY, OF TORONTO, CANADA.

SOLAR MOTOR.

1,386,781. Specification of Letters Patent. Patented Aug. 9, 1921.

Application filed September 7, 1918. Serial No. 253,023.

*To all whom it may concern:*

Be it known that I, WALTER JAMES HARVEY, a subject of the King of Great Britain, and resident of the city of Toronto, county of York, Province of Ontario, in the Dominion of Canada, have invented certain new and useful Improvements in Solar Motors, described in the following specification and illustrated in the accompanying drawings, that form part of the same.

The principal objects of this invention are to utilize the heat energy of the sun's rays in the production of power and to devise an apparatus of extremely high efficiency which will obtain the maximum result from the sun's rays for the maximum period.

The principal features of the invention consist in the novel construction and operation of a reflecting member and a power generator unit whereby the reflecting member is automatically adjusted to the changing position of the sun in its course and to direct the rays of the sun to a focal point for the maximum period between sunrise and sunset and to provide a heat absorbing power developing medium which is maintained in operating unison with the reflecting medium.

Figure 1 is a diagrammatic elevational view illustrating my improved apparatus.

Fig. 2 is a front elevational view of the reflecting member.

Fig. 3 is a plan view and Fig. 4 is a perspective detail of one of the adjustable individual reflecting members.

In carrying this invention into effect I provide an elevated trackway 1 which is the major part of a circle and is supported upon suitable columns 2. Upon this trackway are mounted a pair of trolleys 3 each having a grooved wheel 4 supported on the said trackway, the trolley frame extending downwardly at the inner side of the track and carrying a vertical bar 6, said bars supporting between them the reflecting member which will be hereinafter explained in detail.

The shafts 7 which are secured to the wheels 4 support the trolleys and to one end of one of these shafts is secured a ratchet wheel 8. This ratchet wheel is rotated by a pawl 9 operated by an electro-magnet 10. At the opposite end of the shaft is arranged a worm 11 which meshes with the worm wheel 12 supported in transversely arranged bearings in the frame of the trolley.

The electro-magnet is connected by the wires 13 and 14 with a clock work mechanism 15 which causes periodical operations of the electro-magnet and thereby effects rotation of the wheel 4 of each of the trolleys and as said wheels are rotated the trolleys are caused to move around the circular trackway carrying with them the reflecting member.

The reflecting member comprises a frame having the end bars 16 pivotally mounted midway of their length on the lower ends of the bars 6 carried by the trolleys. These pivotal bars are rigidly spaced apart by the top and the bottom rods 17. A plurality of bars 18 extend transversely between the pivotal bars 16 and at one end are provided with the crank arms 19, said crank arms having the slots 20 at the outer ends.

Secured to each of the bars 18 at uniform distances apart in the length thereof are a plurality of small reflectors 21 which may be formed with flat or concaved surfaces as may be desired. Each of the reflectors 21 is pivotally supported upon a bolt 18' secured in a bar 18 and held by a coil spring 21' encircling the bolt and they are adjusted by means of the screws 21" in such a manner as to direct the light rays falling thereon and reflected therefrom to a point common to the entire row on each bar and the various bars are adjusted in such a manner that the light rays falling upon the reflectors will concentrate at a point common to the vertical rows that is to say, the reflecting surfaces are adjusted upon the bars in such a manner as to direct the rays reflected thereon to a common focal point, which point is preferably the center of the circular track.

The clock work mechanism is so arranged and regulated as to cause the reflector frame carried by the trolleys to move in unison with the transverse movement of the sun so that its rays will always strike the reflecting surfaces at the same angle in so far as the transverse movement of the sun is concerned but it is necessary in order to maintain a constant relation between the reflecting surfaces and the sun that an adjustment other than that caused by the rotation of the reflecting member as a whole, shall be effected. In order to accomplish such an adjustment the crank arms 19 are connected together by means of a bar 22 having pins 23 extending into the slots in said crank arms. The bar is slidably supported in a bracket 24 carried on one of the pivotal bars 16.

A rotatable spindle 25 is journaled in a bracket arm 26 secured to the lower end of one of the vertical bars 6 and upon this spindle is secured an eccentric 27 the surface of which is adapted to engage a roller pin 28 secured to the bar 22. The spindle 25 is rotated by a suitable belt 29 passing around the wheel 30 carried on the spindle and the wheel 31 mounted upon the spindle 32 driven by the worm wheel of the trolley.

The gear ratio of the worm and wheel and the wheels 30 and 31 is such as to follow the rise of the sun from the horizon toward the zenith to maintain a constant focus. The maximum movement of the eccentric is reached as the sun crosses the meridian and the subsequent motion moves the reflectors to maintain the constant focus as the reflector travels around the trackway 1.

The eccentric 27 is rendered adjustable by being mounted upon an inner eccentric 33 so that by loosening the lock screw the outer eccentric may be rotated upon the inner eccentric thereby effecting a difference in the throw or tilting of the reflecting members.

At the focal center of the circular trackway I provide a stand 34 having a column 35 rising from one end thereof and upon this column is rotatably mounted a small steam generator 36. This generator is preferably of rectangular form and water is fed to the bottom thereof by a pipe 37 leading upwardly through the standard and connected by a rotatable joint.

An insulating casing 38 surrounds the generator 36 said casing having an opening in the side facing the reflector member through which the convergent rays are directed.

A steam pipe 39 is connected by a rotatable joint to the top of the generator. The steam generated is conveyed to a suitable steam turbine 40 mounted upon the base of the stand 34 and the exhaust is carried through the pipe 41 to a suitable condenser here shown as a coil 42.

The condensed water is taken from the condenser and returned to the water pipe 37 by a suitable pump 43, said pump being operated by steam carried thereto through the pipe 39.

The steam turbine is preferably coupled to an electro-generator 45 to produce the power which may be transmitted wherever desired.

The insulating casing of the generator 36 is connected by rods 46 to the vertical bars 6 so that as the reflector moves around the circular frame in following the sun the generator is turned on its pivot and maintains a constant relation with the reflector member.

A device such as described has the capability of utilizing the heat energy in the sun's rays to the maximum extent as it follows the movement of the sun.

What I claim as my invention is:—

1. A solar motor comprising, a circular trackway, a reflector member suspended from said trackway and adapted to focus the sun's rays to a common focal point, means for causing said reflector member to be moved around said trackway to follow the movement of the sun from east to west, means operatively connected with the means for moving the reflector member on said trackway for operating the reflector member to follow the upward and downward movement of the sun, and a power generator unit arranged at the focal point of the reflector member and adapted to generate power from the heat of the rays focussed thereon.

2. A solar motor comprising an elevated circular trackway, a pair of trolleys each formed with a grooved wheel running on said trackway and supporting a frame, electrically operated ratchet mechanism for rotating said trolley wheels, a reflector member suspended from said trolleys, means operated through the movement of the trolleys for mechanically adjusting the reflector member to follow the up and down movement of the sun and a power generator arranged at the focal point of said reflector member.

3. A solar motor comprising, a circular trackway, a pair of trolleys supported on said trackway, electrical time controlled means for moving said trolleys, a plurality of rods extending across said frame, individual reflector member secured to said rods, means operated from the movement of said trolleys around the circular trackway for rotating said rods and tilting the reflector member, and a steam generator arranged at the focal point of the reflector member.

4. A solar motor comprising, a circular trackway, a pair of trolleys supported on said trackway, time controlled means for moving said trolleys on said trackway, a frame suspended from said trolleys, a plurality of rods extending across said frame, individual reflector members secured to said rods, crank arms connected to the ends of said rods, a bar connected to said crank arms, an eccentric adapted to operate said bar and said crank arms, and means for rotating said eccentric in a definite ratio to the travel of the trolleys around said trackway, and a power generator arranged at the focal point of said reflectors.

5. A solar motor comprising, an elevated circular trackway, a pair of trolleys mounted on said trackway and each comprising a grooved wheel and a frame supported from said grooved wheel, electrically operated time controlled means for rotating said wheel, a worm rotating with said wheel, a worm wheel operatively connected with said worm, a pulley rotating with said worm wheel, a reflector frame suspended from said trolleys having a plurality of transverse bars each supporting a plurality of reflectors and having cranked ends, a bar connecting the cranked ends of said reflector supporting bars, a roller pin extending from said connecting bar, a spindle rotatably mounted on the frame support, a wheel secured to said spindle, a belt connecting said spindle wheel with the wheel on one of said trolleys, an eccentric secured to said spindle and engaging said roller pin, and a power generator arranged at the focal point of said reflectors.

6. A solar motor, comprising, an elevated circular trackway, a reflector member suspended from said trackway, means for moving said reflector member around said trackway in unison with the movement of the sun, a column having a steam generator pivotally mounted thereon, means for feeding water to said generator, means for conducting the steam from said generator, and means for rotating said generator on its axis in unison with the movement of the reflector member around said trackway.

7. A solar motor, comprising an elevated circular trackway, a reflector member suspended from said trackway, means for moving said reflector member around said trackway in unison with the movement of the sun, a column having a steam generator pivotally mounted thereon, a water feed pipe leading upwardly through said column and entering the bottom of said generator, a steam pipe rotatably connected with the top of said generator, an insulating casing inclosing said steam generator and having an opening in the side adjacent to the reflector member, and rods connecting said reflector member with said insulating casing to rotate said generator and casing on its pivot in unison with the movement of the reflector member on its trackway.

WALTER JAMES HARVEY.